(12) United States Patent
Zhao et al.

(10) Patent No.: US 12,256,341 B2
(45) Date of Patent: **\*Mar. 18, 2025**

(54) ELECTRONIC DEVICE AND METHOD FOR WIRELESS COMMUNICATION, AND COMPUTER-READABLE STORAGE MEDIUM

(71) Applicant: Sony Group Corporation, Tokyo (JP)

(72) Inventors: Youping Zhao, Beijing (CN); Cong Lu, Beijing (CN); Chen Sun, Beijing (CN); Xin Guo, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/509,674

(22) Filed: Nov. 15, 2023

(65) Prior Publication Data

US 2024/0089871 A1     Mar. 14, 2024

Related U.S. Application Data

(63) Continuation of application No. 17/417,118, filed as application No. PCT/CN2020/073937 on Jan. 23, 2020, now Pat. No. 11,849,406.

(30) Foreign Application Priority Data

Feb. 1, 2019   (CN) .......................... 201910105319.3

(51) Int. Cl.
*H04W 52/34*     (2009.01)
*H04W 52/14*     (2009.01)

(52) U.S. Cl.
CPC ........... *H04W 52/34* (2013.01); *H04W 52/14* (2013.01)

(58) Field of Classification Search
CPC ... H04W 52/34; H04W 52/14; H04W 52/243; H04W 52/146; H04W 52/367; H04W 52/38; H04W 52/42
See application file for complete search history.

(56) References Cited

U.S. PATENT DOCUMENTS

2012/0034874 A1   2/2012  Yiu et al.
2012/0071102 A1   3/2012  Palomar et al.
(Continued)

FOREIGN PATENT DOCUMENTS

CN    103139785 A    6/2013
CN    103269514 A    8/2013
(Continued)

OTHER PUBLICATIONS

International Search Report and Written Opinion mailed on Apr. 26, 2020, received for PCT Application PCT/CN2020/073937, filed on Jan. 23, 2019, 8 pages.
(Continued)

*Primary Examiner* — John J Lee
(74) *Attorney, Agent, or Firm* — XSENSUS LLP

(57) ABSTRACT

Provided are an electronic device and method for wireless communication, and a computer-readable storage medium. The electronic device comprises a processing circuit configured to: determine the first power limiting region of the first primary user of a main system, wherein the first power limiting region is a three-dimensional space defined by the directional beams of the first primary user to the third primary user of the main system; and determine one or more secondary users in the first power limiting regions.

16 Claims, 12 Drawing Sheets

(56) References Cited

U.S. PATENT DOCUMENTS

| | | | |
|---|---|---|---|
| 2012/0151534 A1* | 6/2012 | Ponomarev | H04N 21/6131 |
| | | | 725/62 |
| 2012/0322476 A1 | 12/2012 | Sun et al. | |
| 2013/0225159 A1 | 8/2013 | Hulkkonen et al. | |
| 2015/0189513 A1 | 7/2015 | Schmidt et al. | |
| 2016/0020837 A1 | 1/2016 | Schober et al. | |
| 2016/0218786 A1 | 7/2016 | Mizusawa | |
| 2017/0110887 A1* | 4/2017 | Bell | H02J 50/80 |
| 2017/0332243 A1 | 11/2017 | Macmullan et al. | |
| 2018/0048178 A1* | 2/2018 | Leabman | H02J 7/00034 |
| 2018/0098289 A1 | 4/2018 | Visotsky et al. | |
| 2018/0213409 A1 | 7/2018 | Zhao et al. | |
| 2018/0352442 A1 | 12/2018 | Macmullan et al. | |

FOREIGN PATENT DOCUMENTS

| | | | | |
|---|---|---|---|---|
| CN | 103687030 A | 3/2014 | | |
| CN | 103974273 A | 8/2014 | | |
| CN | 104427511 A | 3/2015 | | |
| CN | 104519494 A | 4/2015 | | |
| CN | 104919716 A | 9/2015 | | |
| CN | 106465296 A | 2/2017 | | |
| CN | 106851559 A | 6/2017 | | |
| CN | 107124756 A | 9/2017 | | |
| CN | 107819561 A | 3/2018 | | |
| CN | 108012272 A | 5/2018 | | |
| CN | 108668363 A | 10/2018 | | |
| CN | 109041075 A | 12/2018 | | |
| JP | H07-170561 A | 7/1995 | | |
| JP | 2014-204182 A | 10/2014 | | |
| JP | 2015-531554 A | 11/2015 | | |
| JP | 2016-019134 A | 2/2016 | | |
| JP | 2016-208114 A | 12/2016 | | |
| WO | 2009/050588 A1 | 4/2009 | | |
| WO | WO-2014117503 A1 * | 8/2014 | | H04W 16/14 |
| WO | WO-2018215974 A1 | 11/2018 | | |

OTHER PUBLICATIONS

Extended European Search Report issued Mar. 2, 2022, in corresponding European Patent Application 20749572.2.

* cited by examiner

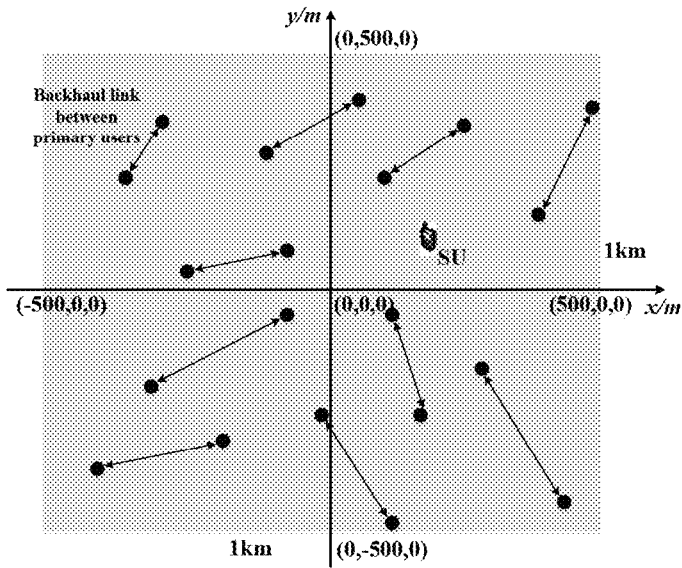

Figure 10

| Parameters | values |
|---|---|
| Operating frequency | 75 GHz |
| Backhaul density | $5/km^2$, $50/km^2$, $500/km^2$ |
| Number of secondary users | 1 (unless otherwise indicated) |
| Simulation area | 1km*1km |
| Channel width | 500 MHz |
| Emitting power of the primary users | 10 dBm |
| SINR threshold of the primary users | 25 dB |
| Maximum emitting power of the secondary users | 50dBm |
| Heights of transceivers of the primary users | 20m~100m |
| Height of the secondary users | 1.5m (unless otherwise indicated) |
| 3dB bandwidth of directional antenna (that is, half-wave angle) | 1.5° |
| Gain of directional antenna | 44 dB |
| Path loss coefficient | 2 |

Figure 11

ELECTRONIC DEVICE AND METHOD FOR WIRELESS COMMUNICATION, AND COMPUTER-READABLE STORAGE MEDIUM

CROSS-REFERENCE TO RELATED APPLICATIONS

The present application is a continuation of U.S. application Ser. No. 17/417,118, filed Jun. 22, 2021, which is based on PCT filing PCT/CN2020/073937, filed Jan. 23, 2020, which claims the priority to Chinese Patent Application No. 201910105319.3, titled "ELECTRONIC DEVICE AND METHOD FOR WIRELESS COMMUNICATION, AND COMPUTER-READABLE STORAGE MEDIUM", filed on Feb. 1, 2019 with the China National Intellectual Property Administration, each of which is incorporated herein by reference in its entirety.

TECHNICAL FIELD

The present disclosure relates to the technical field of wireless communications, and in particular to the protection of primary users in a scenario where primary users and secondary users coexist. More specifically, the present disclosure relates to an electronic apparatus and a method for wireless communications and a computer-readable storage medium.

BACKGROUND

With the rapid development of wireless technology, available electromagnetic spectrums are becoming increasingly crowded. However, for some licensed frequency bands, such as TV broadcasting frequency band and millimeter wave frequency band, the spectrum utilization rate is still very low. In recent years, as a typical application of cognitive radio, dynamic spectrum access technology becomes a research hotspot, opening up a new way to improve the spectrum utilization rate. In the case of adopting the dynamic spectrum access, authorized users, that is, primary users (PU) and secondary users (SU) share spectrum resources in a licensed frequency band.

For example, millimeter waves are electromagnetic waves having a wavelength ranging from 1 mm to 10 mm and having a frequency ranging from 30 GHz to 300 GHz. Compared with waves in low frequency bands, the millimeter wave transmission has characteristics such as an extremely wide bandwidth, an extremely narrow beam, a higher path loss. How to more effectively use the millimeter wave frequency band and how to allocate spectrum resources reasonably and efficiently to avoid harmful interferences to authorized users, that is, the primary users, during the use of the spectrum resources by secondary users, are issues required to be resolved in sharing the millimeter wave frequency band.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry. The processing circuitry is configured to: determine a first power limited zone for a first primary user in a primary system, where the first power limited zone is a three-dimensional space defined by a directional beam from the first primary user to a third primary user in the primary system; and determine one or more secondary users in the first power limited zone.

According to another aspect of the present disclosure, a method for wireless communications is provided. The method includes: determining a first power limited zone for a first primary user in a primary system, where the first power limited zone is a three-dimensional space defined by a directional beam from the first primary user to a third primary user in the primary system; and determining one or more secondary users in the first power limited zone.

According to an aspect of the present disclosure, an electronic apparatus for wireless communications is provided. The electronic apparatus includes processing circuitry. The processing circuitry is configured to: obtain, from a spectrum management device, information of a power limited zone of a primary user and information of a maximum allowable emitting power of a secondary user, where the power limited zone of the primary user corresponds to a three-dimensional space covered by a directional beam of the primary user; determine, based on a position of the secondary user, whether the secondary user is located in the power limited zone; and limit emitting power of the secondary user to be below the maximum allowable emitting power in a case that the secondary user is located in the power limited zone.

According to another aspect of the present disclosure, a method for wireless communications is provided. The method includes: obtaining, from a spectrum management device, information of a power limited zone of a primary user and information of a maximum allowable emitting power of a secondary user, where the power limited zone of the primary user corresponds to a three-dimensional space covered by a directional beam of the primary user; determining, based on a position of the secondary user, whether the secondary user is located in the power limited zone; and limiting emitting power of the secondary user to be below the maximum allowable emitting power in a case that the secondary user is located in the power limited zone.

According to other aspects of the present disclosure, there are further provided computer program codes and computer program products for implementing the methods for wireless communications above, and a computer readable storage medium having recorded thereon the computer program codes for implementing the methods for wireless communications described above.

With the electronic apparatus and method according to the present disclosure, power limited zones for primary users are set to reduce the range of the secondary users to be considered, significantly reducing the complexity and overhead of the spectrum management system, while effectively avoiding harmful interferences to the primary users.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings:

FIG. 10 shows a top view of a simulation scenario;

FIG. 11 shows an illustration diagram of simulation parameters setting;

DETAILED DESCRIPTION OF THE EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a service, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

In a coexistence scenario, spectrum resources of licensed spectrum may be dynamically utilized among different wireless communication systems (including a primary system and a secondary system), and it is required to manage the dynamic usage of the spectrum resources. For example, a central management device or a spectrum management device may be arranged to manage the usage of the spectrum resources by the wireless communication systems in a region managed by the central management device or the spectrum management device. In this application, the base stations and user equipment in the wireless communication systems are called users. The base stations and user equipment in the primary system are called primary users, and the base stations and user equipment in the secondary system are called secondary users. Generally, there are multiple users in the region managed by the central management device or the spectrum management device. The central management device reasonably allocates available spectrum resources among these users, ensuring resource utilization efficiency and fairness, while ensuring that communications of the primary users are not harmfully interfered by the presence of the secondary users.

An example of the central management device or the spectrum management device may refer to a spectrum access system (SAS) for a citizens broadband radio service (CBRS). The main functional entities in the CBRS include citizens broadband radio service devices (CBSDs) and end user devices (EUDs). The functional entities for spectrum management include, for example, an SAS, a spectrum management database (SMD), a group spectrum coordinator (GSC), or the like.

Figure 1:
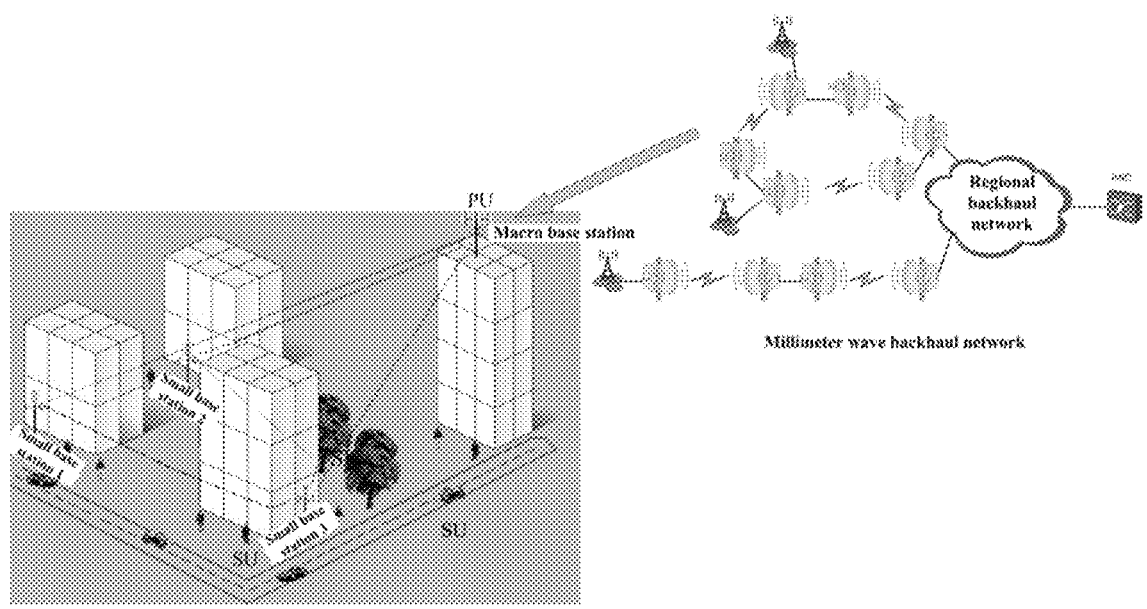
FIG. 1 shows a schematic example of a three-dimensional coexistence scenario of a primary system and a secondary system.

In addition, since the beams on the millimeter wave band have good directivity, the primary users, for example, may backhaul broadband data by using a directional antenna or an array antenna. FIG. 1 shows a schematic example of a three-dimensional coexistence scenario of a primary system and a secondary system. As shown in FIG. 1, there is a backhaul link using millimeter wave communication between a macro base station and each of small base stations in the primary system. Each of the secondary uses is arranged with a single antenna or a multi-antenna omnidirectional antenna. The secondary user may be, for example, a fixed wireless access point (base station), a pedestrian, a vehicle, an unmanned aerial vehicle, a user on different floors, or the like. In a case that a secondary user is located in a half-wave angle beam range of a directional antenna of a primary user, the secondary user may produce harmful interferences to the primary user, that is, produce harmful interferences to the communication on a backhaul link. On the contrary, a secondary user located outside the half-wave angle beam range of the directional antenna of the primary user has a low probability to produce harmful interferences to the primary user.

It should be understood that FIG. 1 only shows an example of a three-dimensional coexistence scenario. The scenarios where the present disclosure may be applied are not limited thereto. The present disclosure may be applied to any coexistence scenarios where the primary user uses a directional antenna. In addition, the interfered link to be considered is not limited to the above mentioned backhaul link. For example, a communication link between the base station and user equipment in the primary system may also be considered.

Figure 2:
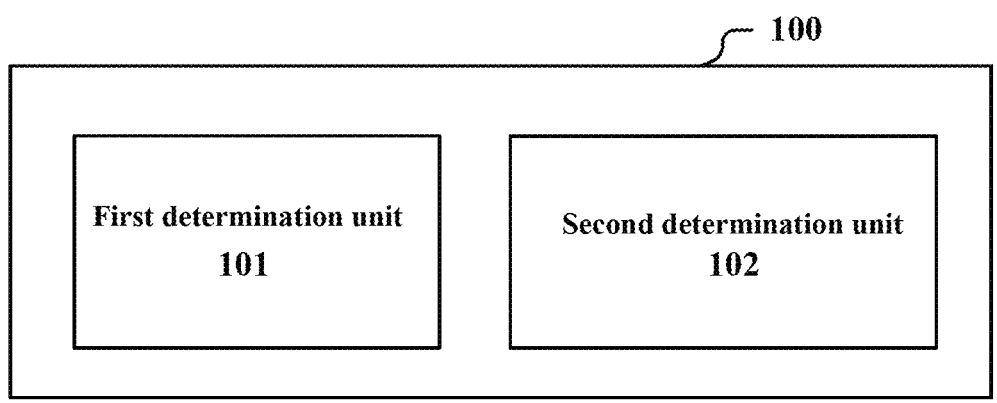
FIG. 2 is a block diagram showing functional modules of an electronic apparatus for wireless communications according to an embodiment of the present disclosure.

FIG. 2 is a block diagram showing functional modules of an electronic apparatus for wireless communications according to an embodiment of the present disclosure. As shown in FIG. 2, the electronic apparatus 100 includes: a first determination unit 101 and a second determination unit 102. The first determination unit 101 is configured to determine a power limited zone for a first primary user in a primary system, where the first power limited zone is a three-dimensional space defined by a directional beam from the first primary user to a third primary user in the primary system. The second determination unit 102 is configured to determine one or more secondary users in the power limited zone.

The first determination unit 101 and the second determination unit 102 may be implemented by one or more processing circuitries, and the processing circuitry, for example, may be implemented as a chip or a processor. Moreover, it should be noted that, functional units in the electronic apparatus shown in FIG. 2 are only logic modules which are divided based on the specific functions thereof, and are not intended to limit the implementations. This also applies to the examples of other electronic apparatuses to be described later.

The electronic apparatus 100, for example, may be arranged on a central management device side or a spectrum management device side or may be communicatively connected to a central management device or a spectrum management device. In addition, the electronic apparatus 100 may be arranged on a core network side. The central management device or the spectrum management device may be implemented as various functional entities, such as an SAS, a CxM, or a GSC in the CBRS architecture. In the CBRS architecture, the SAS may be configured to implement a part of the functions of the electronic apparatus 100, and the CxM may be configured to implement another part of the functions of the electronic apparatus 100, and so on. It should be understood that these are not limited.

It should be further noted that the electronic apparatus 100 may be implemented at a chip level or a device level. For example, the electronic apparatus 100 may function as a central management device or a spectrum management device itself, and may further include an external device such as a memory and a transceiver (not shown in FIG. 2). The memory may store programs and related data information for implementing various functions by the central management device or the spectrum management device. The transceiver may include one or more communication interfaces to support communication with different devices (for example, a base station, another central management device or spectrum management device, user equipment, or the like). The implementation of the transceiver is not limited here.

It should be understood that "first", "second", and the like in terms are used only for distinguishing and describing, and do not represent any meaning or an order.

Figure 3:
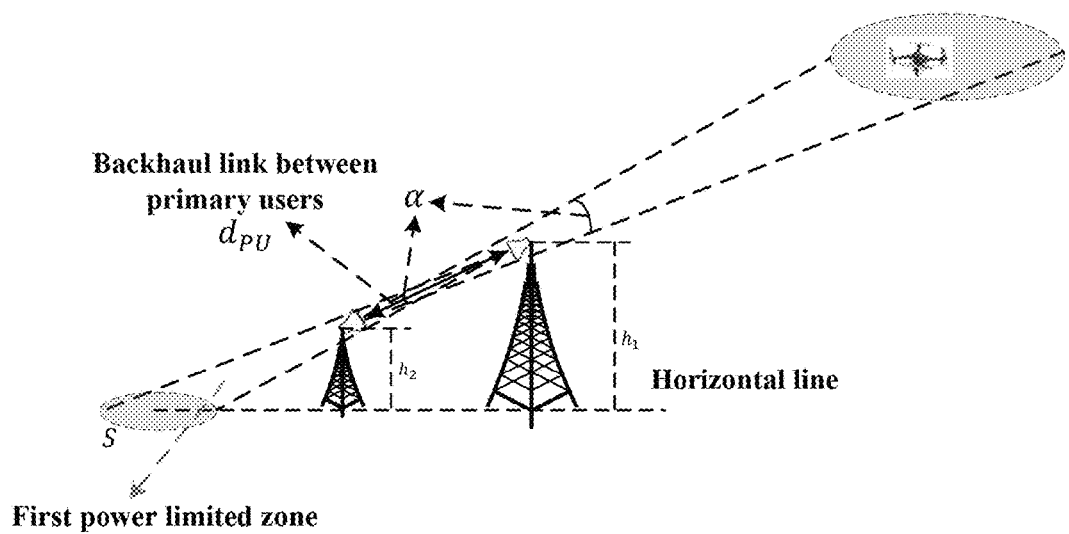
FIG. 3 shows a schematic diagram of determining a power limited zone.

For example, the first determination unit 101 may determine the power limited zone based on position information and antenna configuration information of the first primary user and the third primary user. The scenario shown in FIG. 1 is still taken as an example. For example, the macro base station is a first primary user, and the small base station is a third primary user. FIG. 3 shows a schematic diagram of determining a power limited zone.

As shown in FIG. 3, the height of the first primary user is $h_1$, the height of the third primary user is $h_2$, the half-wave angle of the directional beam transmitted by the first primary user and the half-wave angle of the directional beam transmitted by the third primary user are both $\alpha$, there is a backhaul link between the first primary user and the third primary user, and the distance between the first primary user and the third primary user is $d_{PU}$. As shown in FIG. 3, a cone-shaped three-dimensional space defined by the half-wave angle of the directional beam from the first primary user to the third primary user is the power limited zone. When the power limited zone is projected onto the horizontal plane, an elliptical region S shown by the dotted line is obtained. It should be understood that the power limited zone may be obtained by performing calculation based on position information, such as a height and horizontal coordinates, of the first primary user and the third primary user, and antenna configuration information, such as a half-wave angle of a directional antenna, of the first primary user and the third primary user. For example, the area of the elliptical region S may be calculated by using the following equation:

$$S = \pi \cdot \frac{h_1 \cdot \sin\alpha}{2\cos(\beta+\alpha/2)\cos(\beta-\alpha/2)} \cdot \frac{h_1 \cdot d_{PU}}{h_1 - h_2} \cdot \tan\left(\frac{\alpha}{2}\right) \quad (1)$$

where $\beta = \arccos[(h_1-h_2)/d_{PU}]$.

FIG. 3 further shows a power limited zone of the third primary user. Since the height of the third primary user is lower than the height of the first primary user in FIG. 3, the power limited zone of the third primary user is in the air. In addition, FIG. 3 shows a cross section of the power limit zone at a height, and there is an unmanned aerial vehicle as a secondary user in the cross section.

The second determination unit 102 may be, for example, configured to determine whether the secondary user is located within the power limited zone based on at least location information of the secondary user.

In another embodiment, the power restriction zone may not be calculated explicitly. The second determination unit 102 is configured to calculate an angle between a connection line from the first primary user to the third primary user and a connection line from the first primary user to the secondary user, and determine that the secondary user is located in the power limited zone in a case that the calculated angle is less than half of a lobe width (that is, a half-wave angle) of the directional beam.

Figure 4:
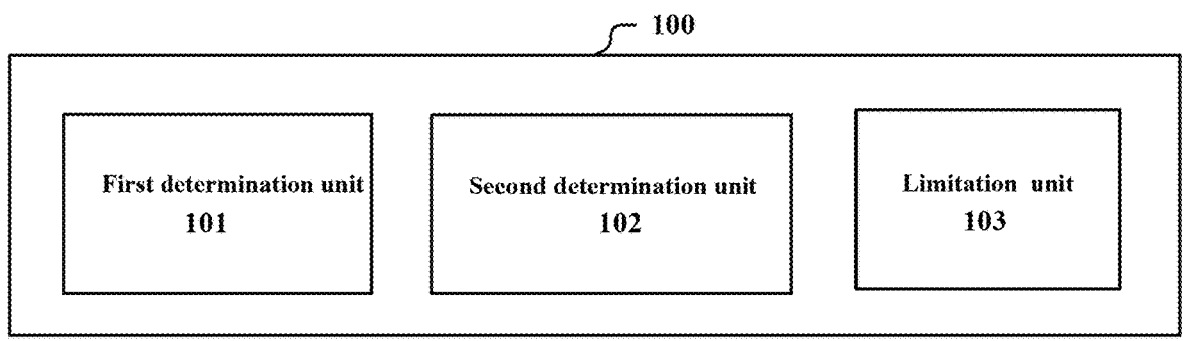
FIG. 4 is a block diagram showing functional modules of an electronic apparatus for wireless communications according to an embodiment of the present disclosure.

FIG. 4 is a block diagram showing functional modules of an electronic apparatus 100 for wireless communications according to an embodiment of the present disclosure. Compared with the electronic apparatus 100 shown in FIG. 2, the electronic apparatus 100 shown in FIG. 4 further includes a limitation unit 103. The limitation unit 103 is configured to limit emitting power of one or more secondary users in the power limited zone based on a communication quality requirement of the primary system.

In the coexistence scenario, the secondary system may use the spectrum resources under the premise of ensuring the communication quality requirement of the primary system. In this embodiment, the electronic apparatus 100 determines the power limited zone, and limits the emitting power of the secondary users located in the power limited zone, limiting the cumulative interferences of the secondary users to the primary users within an allowable range, and thereby ensuring the communication quality of the primary system. In addition, the secondary systems to be considered are limited to the secondary systems located in the power limited zone, reducing the complexity and overhead of spectrum management.

For example, the limitation unit 103 may be configured to calculate a maximum interference power acceptable to the first primary user based on the communication quality requirement of the primary system, such as a desired signal to interference and noise ratio (SINR), and calculate a maximum allowable emitting power for each of the secondary users located in the power limited zone based on the maximum interference power.

The maximum interference power acceptable to the first primary user may be calculated based on various communication system models. An example is shown below.
It is assumed that a signal to interference and noise ratio threshold of the first primary user is $SINR_{PU}^{th}$ which may be determined based on the QoS (such as, a bit error rate) required by the primary system and the coding and modulation manner adopted by the transceiver of the primary user. The emitting power of the first primary user is $P_{PU}^{Tx}$, the receiving power of the first primary user is $P_{PU}^{Rx}$, the emitting antenna gain of the first primary user is $G_{Tx}$, the receiving antenna gain of the first primary user is $G_{Rx}$, and N represent the noise power. The maximum interference power I acceptable to the first primary user is expressed as the following equation:

$$I_{th} = \frac{P_{PU}^{Rx}}{SINR_{PU}^{th}} - N \quad (2)$$

These interferences come from secondary users in the power limited zone. Assuming that a distance between a secondary user in the power limited zone and the first primary user is $d_{PU}^{SU}$ and the path loss coefficient is n, the following equation (3) should be meet.

$$I_{th} \geq P_{SU}^{Tx} \cdot G_{Rx} \cdot (4\pi d_{PU}^{SU}/\lambda)^{-n} \quad (3)$$

In a case that there is only one secondary user located in the power limited zone, the maximum allowable emitting power of the secondary user may be calculated by using the following equation:

$$P_{SU}^{max} = \frac{I_{th}}{G_{Rx} \cdot (4\pi d_{PU}^{SU}/\lambda)^{-n}} \quad (4)$$

In a case that there are multiple secondary users located in the power limited zone, the limitation unit 103 is configured to allocate, in a case of ensuring that maximum cumulative interferences by the secondary users to the first primary user do not exceed the maximum interference power, maximum interference power that can be produced by each of the secondary users to the first primary user, and calculate, based on the maximum interference power, the a maximum allowable emitting power for each of the secondary users. Taking the equation (4) as an example, the numerator is a maximum interference power the corresponding secondary user can be produced which is allocated to the secondary user.

In an embodiment, the maximum interference power may be evenly allocated to each of the multiple secondary users. For example, it is assumed that there are totally $N_{SU}$ secondary users in the power limited zone, and maximum interference power that each of the $N_{SU}$ secondary users can produce to the primary user is $I_{th}/N_{SU}$. Still taking equation (4) as an example, a maximum allowable emitting power of each of the secondary users is calculated by using the following equation:

$$P_{SU_i}^{max} = \frac{I_{th} \cdot w_i}{G_{Rx} \cdot (4\pi d_{PU}^{SU_i}/\lambda)^{-n}} \quad (5)$$

where $P_{SU_i}^{max}$ represents a maximum emitting power of an i-th secondary user in the power limited zone; $d_{PU}^{SU_i}$ represents a distance between the i-th secondary user and the primary user; $w_i=1/N_{SU}$, $w_i$ represents a weight of harmful interferences to the primary user for backing off emitting power of each of the secondary users, and $w_1=w_2=\ldots=w_{N_{SU}}$ since the power backoff values of the secondary users are the same in this case.

In another embodiment, the maximum interference power may be allocated based on the type of the secondary user or the power adjustment capability of the secondary user. Since the types of secondary users may be different, for example, the secondary users may be base stations or user equipment. The capabilities (or ranges) for the secondary user to adjust the emitting power are also different. Therefore, the harmful cumulative interferences to the primary user may be allocated to the secondary users based on the types or power adjustment capabilities of the secondary users. In this case, if the maximum emitting power of each of the secondary users is calculated by using equation (5), each of the secondary users has its own weight $w_i=1/N_{SU}$, and the weights of the secondary users may be different.

The maximum allowable emitting power of each of the secondary users is adjusted based on a type of the secondary user in the power limited zone, and the communication performance of each of the secondary users may be improved as much as possible under the premise of ensuring the communication quality of the first primary user, increasing the number of the accessible secondary users in the power limited zone. It should be understood that the secondary user may include a base station in a secondary system and/or user equipment in the secondary system.

In addition, in a case that the first primary user and the secondary users are arranged with multiple antennas (such as an array antenna), assuming that the receiver of the first primary user may use an interference suppression matrix for reception and the channel matrix between the transmitter of the secondary user and the receiver of the first primary user is $H_1$, the maximum allowable emitting power of the secondary user may be calculated by using the following equation (assuming that there is only one secondary user located in the power limited zone):

$$P_{SU}^{max} = \frac{I_{th}}{tr\left(H_1^H \cdot H_1\right) \cdot \left(4\pi d_{PU}^{SU}/\lambda\right)^{-n}} \quad (6)$$

$$\text{where } I_{th} = \frac{P_{PU}^{Rx}}{10^{SINR_{th}^{PU}/10}} - N \quad (7)$$

The definitions of the symbols in equations (6) and (7) are the same as the definitions of the symbols in equations (2) and (4) described above, and are not repeated herein. In a case that there are multiple secondary users located in the power limited zone, a maximum allowable emitting power of each of the secondary users is calculated by using the following equation:

$$P_{SU}^{max} = \frac{I_{th} \cdot w_i}{tr\left(H_1^H \cdot H_1\right) \cdot \left(4\pi d_{PU}^{SU}/\lambda\right)^{-n}} \quad (8)$$

It should be noted that the above descriptions and the following descriptions are also applicable to the case where the primary user and the secondary user are arranged with an array antenna.

Figure 5:
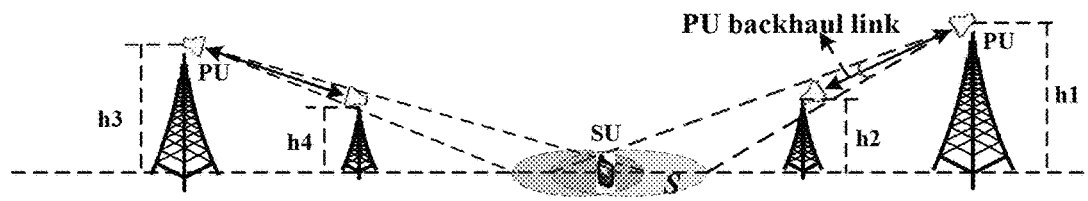
FIG. 5 shows a schematic diagram of a situation where multiple power limited zones overlap.

There is also a case where a secondary user is located in an overlapping part of power limited zones of multiple primary users. As shown in FIG. 5, a primary user with a height of $h_1$ on the right (referred to as a first primary user) has a first power limited zone in consideration of a backhaul link between the first primary user and a primary user with a height of $h_2$ (referred to as a third primary user), a primary user with a height of $h_3$ on the left (referred to as a second primary user) has a second power limited zone in consideration of a backhaul link between the second primary user and a primary user with a height of $h_4$ (referred to as a fourth primary user), and the first power limited zone and the second power limited zone have an overlapping part. A secondary user located in the overlapping part may produce harmful interferes to the first primary user and the second primary user. Therefore, the maximum allowable emitting power of the secondary user located in the overlapping part should be limited according to the requirements of both the first primary user and the second primary user.

First, a first power limited zone for the first primary user is determined as described above, and a maximum allowable emitting power (for distinction, the maximum allowable emitting power is called a first maximum allowable emitting power) of each of secondary users located in the first power limited zone is calculated. Similarly, a second power limited zone for the second primary user is determined, and a second maximum allowable emitting power of each of secondary users located in the second power limited zone is calculated. The second power limited zone is a three-dimensional space defined by the directional beam from the second primary user to the fourth primary user. In a case that there is a particular secondary user located in an overlapping part of the first power limited zone and the second power limited zone, the limitation unit 103 determines the smaller one of the first maximum allowable emitting power and the second maximum allowable emitting power as the maximum allowable emitting power of the particular secondary user.

More generally, assuming that a secondary user may produce harmful interferences to M primary users, the maximum emitting power (respectively corresponding to the M primary users) of the secondary user is: $P_{SU}^{max_1}$, $P_{SU}^{max_2}, \ldots, P_{SU}^{max_M}$, and the maximum allowable emitting power of the secondary user is obtained by using the following equation:

$$P_{SU}^{max} = \min(P_{SU}^{max_1}, P_{SU}^{max_2}, \ldots, P_{SU}^{max_M}) \quad (9)$$

In addition, the limitation unit 103 may further be configured, for each of the secondary users, to allocate spectrum resources to the secondary user and set emitting power for the secondary user based on the maximum allowable emitting power of the secondary user. For example, each of the secondary users has a minimum emitting power with which the lowest QoS of the secondary user can be ensured. If the maximum allowable emitting power is lower than the minimum emitting power, it indicates that the secondary user cannot access in the network, and spectrum resources is not to be allocated to the secondary user; otherwise spectrum resources may be allocated to the secondary user. The limitation unit 103 sets emitting power for each of secondary systems to be lower than the maximum allowable emitting power.

On the other hand, the limitation unit 103 may further be configured to determine the maximum number of secondary users allowed in the power limited zone, based on the minimum emitting power of each of the secondary users in the power limited zone while ensuring a requirement for QoS of the secondary user. If the number of secondary users in the power limited zone exceeds the maximum number, the secondary users producing less interferences to the primary user may be allocated with spectrum resources preferentially. In this way, the spectrum utilization efficiency can be improved, and the number of the accessed secondary users in the power limited zone can be increased.

As described above, the secondary users may be moving pedestrians, vehicles, unmanned aerial vehicles, and so on. If a secondary user moves, the spectrum allocation scheme may be adjusted. Thus, the limitation unit 103 may be further configured to dynamically adjust the spectrum allocation and emitting power of the secondary user, in a case that a state of the secondary users in the power limited zone changes by a predetermined degree. The state of the secondary users includes, for example, the number of the secondary users in the power limited zone, the entry and exit of a secondary user to the power limited zone, changes in the emitting power of the secondary users, and changes in the communication quality requirements of the secondary users. If the state of the secondary users changes to a predetermined degree, it indicates that the previous spectrum allocation scheme is no longer applicable and required to be adjusted.

In addition, to avoid frequent adjustments, improve the stability of the spectrum management system, and reduce system overhead, for example, a hysteresis parameter threshold may be set, and the spectrum allocation and the emitting power of the secondary users may be dynamically adjusted, in a case that a time period during which the state of the secondary users in the power limited zone changes by the predetermined degree exceeds the hysteresis parameter threshold. In this way, the influence caused by the rapid or reciprocating movement of the secondary user can be effectively eliminated.

On the other hand, in performing adjustments, spectrum allocation and emitting power of a secondary user with low mobility may be adjusted first, reducing the number of adjustments.

As described above, the maximum interference power acceptable to the primary user is calculated based on the communication quality requirement of the primary system. To ensure the communication quality of the primary system, a predetermined margin is added to the communication quality requirement in the above calculation. For example, if a desired SINR is used as the communication quality requirement, a predetermined margin may be added to the desired SINR. For example, if the desired SINR of the primary system is 25 dB, the maximum interference power may be calculated based on a SINR of 27 dB which is obtained by adding a margin of 2 dB to the desired SINR. With the predetermined margin, the possibility of adjusting the spectrum allocation scheme can be reduced in a case that a secondary user enters and exits the power limited zone.

In the above calculation, one or more of the following is required: position information of the primary users, antenna configuration information of the primary users, position information of the secondary users, antenna configuration information of the secondary users, moving trajectory information of the secondary users, and service types. The information may be obtained from a spectrum management database (SMD). That is, the primary users and the secondary users report respective information to the SMD and the SMD stores the information.

Figure 6:
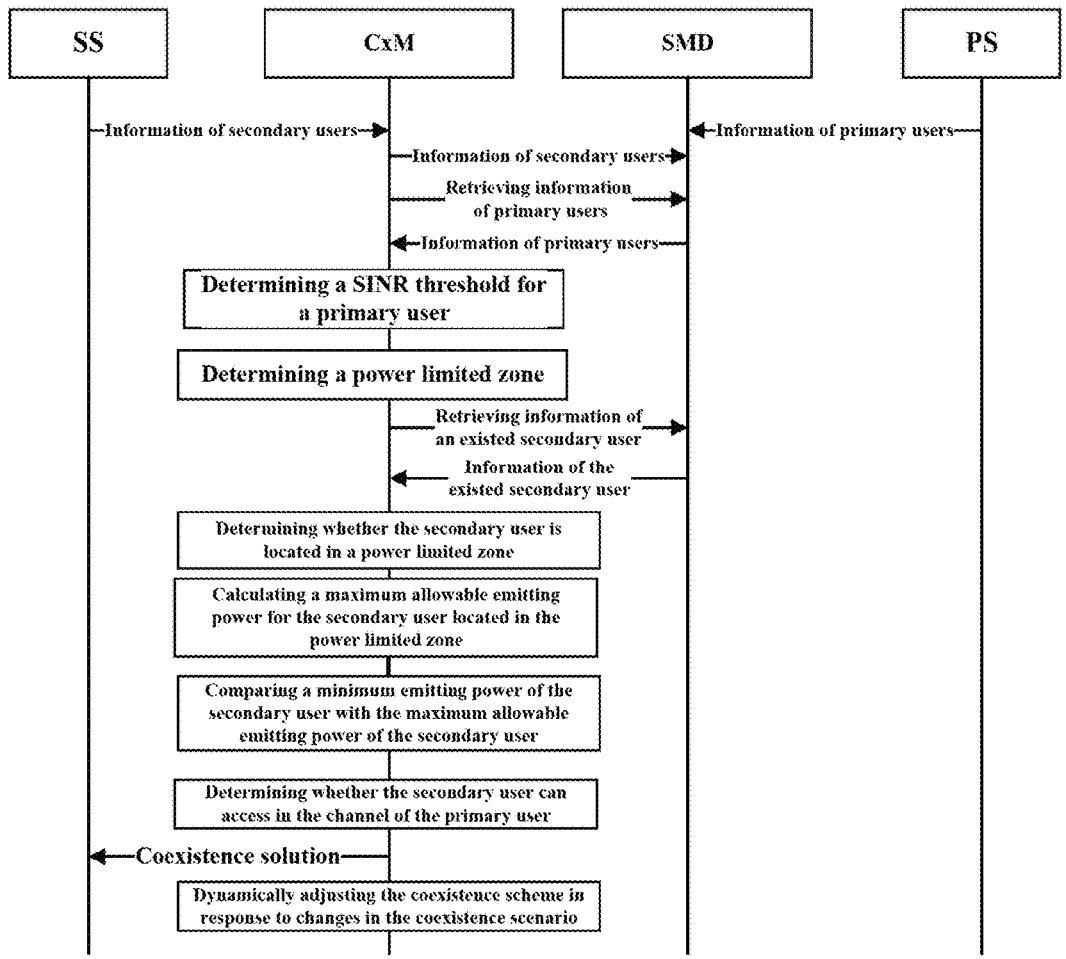
FIG. 6 shows a schematic diagram of an information procedure.

For ease of understanding, FIG. 6 shows a schematic diagram of an information procedure between a primary system (PS), a secondary system (SS), a coexistence manager (CxM), and an SMD. However, the information procedure is not limited to this and may be changed according to actual applications. The functional entities involved are not limited to the CxM and SMD, and the information procedure shown in FIG. 6 is just an example.

As shown in FIG. 6, the secondary system reports information about the secondary users to the CxM. The information about the secondary users includes, for example, position information (may be three-dimensional position information), capability information, antenna configuration information, moving trajectory information, a service type and the like. The secondary users include base stations and user equipment in the secondary system. The CxM transmits the information to the SMD. Similarly, the primary system reports information about primary users to the SMD. The information about primary users includes, for example, position information, antenna configuration information, modulation/coding format and so on.

The CxM then sends a request for retrieving the information about the primary users to the SMD, and receives the retrieved information about the primary users. For each of the primary users, the CxM calculates a SINR threshold and determines a power limited zone based on the information of the primary user, such as the system configuration and QoS requirement of the primary user. Next, the CxM sends a request for retrieving information about an existed secondary user to the SMD and receives the retrieved information about the existed secondary user. The CxM determines whether the secondary user is located in a power limited zone, and calculates a maximum allowable emitting power for the secondary user located in the power limited zone based on the SINR threshold of the primary user. The CxM compares a calculated minimum emitting power with which a requirement for a minimum QoS requirement of the secondary user is met with the maximum allowable emitting power of the secondary user, to determine whether the secondary user can access the spectrum of the primary user. That is, the coexistence solution in the current scenario is determined. The CxM then sends the coexistence solution to the secondary system. The coexistence solution may include information such as the allocated channels and the maximum emitting power. The CxM may dynamically adjust the coexistence solution in response to changes in the coexistence scenario.

In the above example, a spectrum management device calculates the maximum allowable emitting power for each of the secondary users in the power limited zone based on the information of the current scenario, thereby determining the coexistence solution.

In another embodiment, the limitation unit 103 may be configured to pre-calculate a maximum allowable emitting power of a secondary user at each of positions in the power limited zone, based on at least a density of the primary users in the primary system, a density of the secondary users in the primary system, and the communication quality requirements of the primary system. The pre-calculation may be performed based on a model-based simulation or based on an equation similar to equations (2) and (4).

The electronic apparatus 100 broadcasts the information of the power limited zone, such as the range of the three-dimensional space of the power limited zone and the information of the maximum allowable emitting power, to the secondary users, so that each of the secondary users may adjust the emitting power according to a position of a secondary user. In this embodiment, the secondary user determines whether the secondary user is located in a power limited zone of a primary user, and sets or adjusts its own emitting power according to the power restriction requirement of the power limited zone.

In summary, with the electronic apparatus 100 according to the embodiment, a power limited zone for a primary user is set to reduce the range of the secondary users to be considered, significantly reducing the complexity and overhead of the spectrum management system, improving the spectrum utilization efficiency, while effectively avoiding harmful interferences to the primary user.

Second Embodiment

Figure 7:
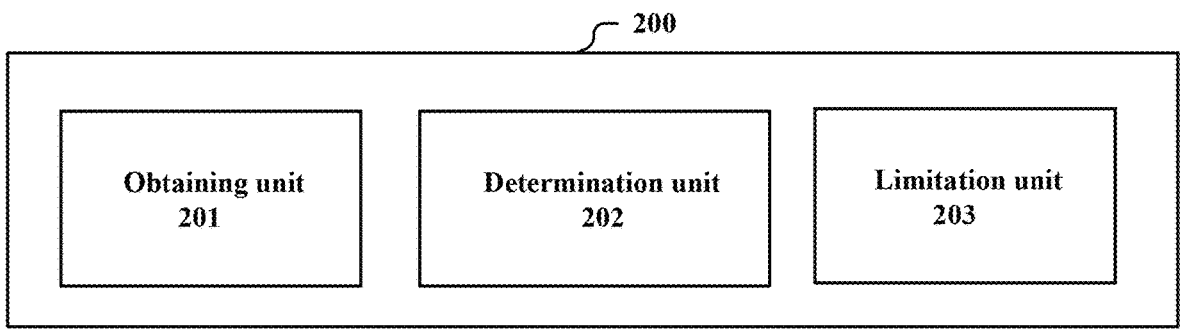
FIG. 7 is a block diagram showing functional modules of an electronic apparatus for wireless communications according to another embodiment of the present disclosure.

FIG. 7 is a block diagram showing functional modules of an electronic apparatus 200 for wireless communications according to another embodiment of the present disclosure. As shown in FIG. 7, the electronic apparatus 200 includes: an obtaining unit 201, a determination unit 202, and a limitation unit 203. The obtaining unit 201 is configured to obtain, from a spectrum management device, information of a power limited zone of a primary user and information of a maximum allowable emitting power of a secondary user, where the power limited zone of the primary user corresponds to a three-dimensional space covered by the directional beam of the primary user. The determination unit 202 is configured to determine, based on a position of the secondary user, whether the secondary user is located in the power limited zone. The limitation unit 203 is configured to limit emitting power of the secondary user to be below the maximum allowable emitting power in a case that the secondary user is located in the power limited zone.

The determination unit 201, the determination unit 202, and the limitation unit 203 may be implemented by one or more processing circuitries, and the processing circuitry, for example, may be implemented as a chip or a processor. Moreover, it should be noted that, functional units in the electronic apparatus shown in FIG. 7 are only logic modules which are divided based on the specific functions thereof, and are not intended to limit the implementations.

The electronic apparatus 200, for example, may be arranged on a secondary user side or may be communicatively connected to a secondary user. The secondary user may be a base station in a secondary system. The base station described in this application may also be a transmit receive point (TRP) or an access point (AP). The secondary user may be user equipment in the secondary system.

It should be noted that the electronic apparatus 200 may be implemented at a chip level or a device level. For example, the electronic apparatus 200 may function as a base station or user equipment itself, and may include an external device such as a memory and a transceiver (not shown in FIG. 7). The memory may be configured to store programs and related data information for implementing various functions by the base station or the user equipment. The transceiver may include one or more communication interfaces to support communication with different devices (for example, other user equipment, other base stations or the like). The implementation of the transceiver is not limited here.

For example, the obtaining unit 201 may obtain the information through a broadcast message. The information may be calculated by a spectrum management device in the way described in the first embodiment. The restrictions on the power limited zone and the maximum allowable emitting power in the first embodiment are also applicable to this embodiment, and are not repeated herein.

The electronic apparatus 200 may provide one or more of position information, antenna configuration information, moving trajectory information, and service type of the secondary user to the spectrum management device.

With the electronic apparatus 200 according to the embodiment, the emitting power of the secondary user may be actively reduced based on the power limited zone of the primary user and the power limitation requirements for the secondary user, effectively avoiding harmful interferences to the primary user, and significantly reducing the complexity and overhead of the spectrum management system.

Third Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 8:
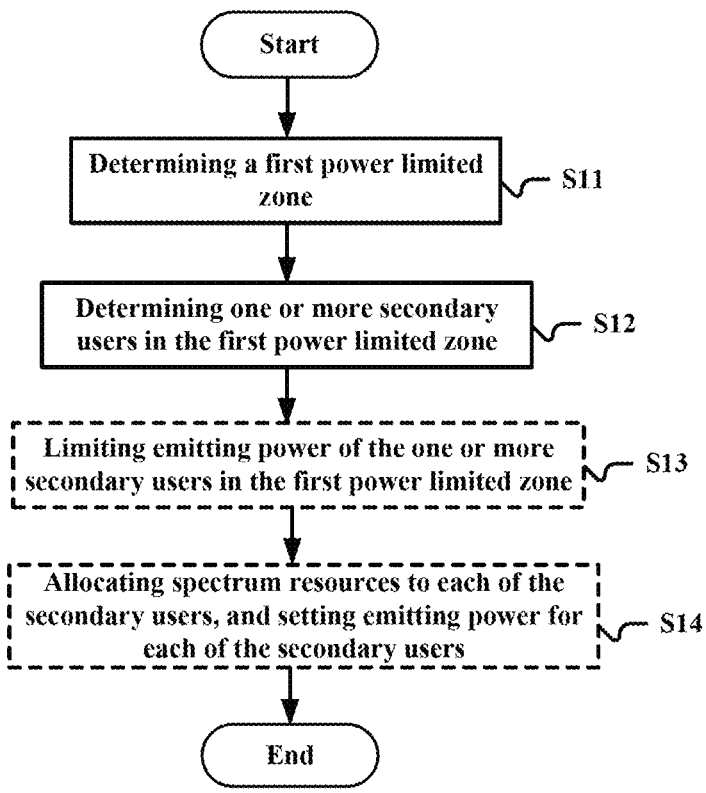
FIG. 8 is a flow chart of a method for wireless communications according to an embodiment of the present disclosure.

FIG. 8 is a flow chart of a method for wireless communications according to an embodiment of the present disclosure. The method includes: determining a first power limited zone for a first primary user in a primary system (S11), where the first power limited zone is a three-dimensional space defined by a directional beam from the first primary user to a third primary user in the primary system; and determining one or more secondary users in the first power limited zone (S12). The secondary user may include a base station and/or user equipment in a secondary system. The primary user and/or the secondary user may be arranged with an array antenna or a single antenna. The method may be performed on a spectrum management device side or a central management device side.

For example, in step S11, the first power limited zone may be determined based on position information and antenna configuration information of the first primary user and the third primary user. In step S12, it may be determined based at least on position information of the secondary user whether the secondary user is located in the first power limited zone.

Alternatively, in step S12, an angle between a connection line from the first primary user to the third primary user and a connection line from the first primary user to the secondary user may be calculated, and it is determined that the secondary user is located in the first power limited zone in a case that the calculated angle is less than half of a lobe width of the directional beam.

Although not shown in FIG. 8, the method may further include a step of obtaining one or more of the following from a spectrum management database: position information of primary users, antenna configuration information of the primary users, position information of the secondary users, antenna configuration information of the secondary users, moving trajectory information of the secondary users, and service types. The information is used in various calculations and determinations in steps S11, S12 and other steps.

As shown by a dashed line block in FIG. 8, the method may further include a step S13. In step S13, emitting power of the one or more secondary users in the first power limited zone is limit based on a communication quality requirement of the primary system. For example, a first maximum interference power acceptable to the first primary user may be calculated based on the communication quality requirement of the primary system, and a first maximum allowable emitting power for each of the secondary users located in the first power limited zone is calculated based on the first maximum interference power. The communication quality requirement includes, for example, a desired signal to interference and noise ratio.

Specifically, a maximum interference power that each of the secondary users can produce to the first primary user may be allocated, while ensuring that maximum cumulative interferences produced by the secondary users to the first primary user do not exceed the first maximum interference power, and the first maximum allowable emitting power for each of the secondary users is calculated based on the maximum interference power. The first maximum interference power may be equally allocated among multiple secondary users, or the first maximum interference power may be allocated based on the type or power adjustment capability of the secondary users. If the first maximum interference power is allocated based on the type or power adjustment capability of the secondary users, allocation weights may be set for different secondary users.

In a case that there are power limited zones of multiple primary users, the maximum emitting power of a secondary user located in an overlapping part of the multiple power limited zones may be determined as the smallest one of the calculated maximum interference power respectively corresponding to the primary users.

As shown by another dashed line block in FIG. 8, the method further includes a step S14. In step S14, for each of the secondary users, spectrum resources is allocated to the secondary user, and emitting power of the secondary user is configured based on the first maximum allowable emitting power of the secondary user.

The method further includes dynamically adjusting spectrum allocation and emitting power of a secondary user, in a case that a state of the secondary user in the first power limited zone changes by a predetermined degree.

To avoid frequent adjustments, a hysteresis parameter threshold may be set, and the spectrum allocation and the emitting power of the secondary user may be dynamically adjusted in a case that a time period during which the state of the secondary users in the power limited zone changes by the predetermined degree exceeds the hysteresis parameter threshold. Spectrum allocation and emitting power of a secondary user with low mobility may be adjusted first. In calculating the first maximum interference power acceptable to the first primary user, a predetermined margin may be added to the communication quality requirement.

On the other hand, the maximum number of secondary users allowed in the first power limited zone may be determined based on the minimum emitting power of each of the secondary users in the first power limited zone while ensuring a requirement for quality of service of the secondary user. If the number of secondary users in the first power limited zone exceeds the maximum number, the secondary users producing less interferences to the first primary user may be allocated with spectrum resources preferentially.

In addition, a first maximum allowable emitting power of a secondary user at each of positions in the first power limited zone may be pre-calculated based on at least a density of the primary users in the primary system, a density of the secondary users, and the communication quality requirements. The information of the range of the first power limited zone and the information of the first maximum allowable emitting power may be broadcasted to the secondary users, so that each of the secondary users may adjust emitting power according to a position of the secondary user.

Figure 9:
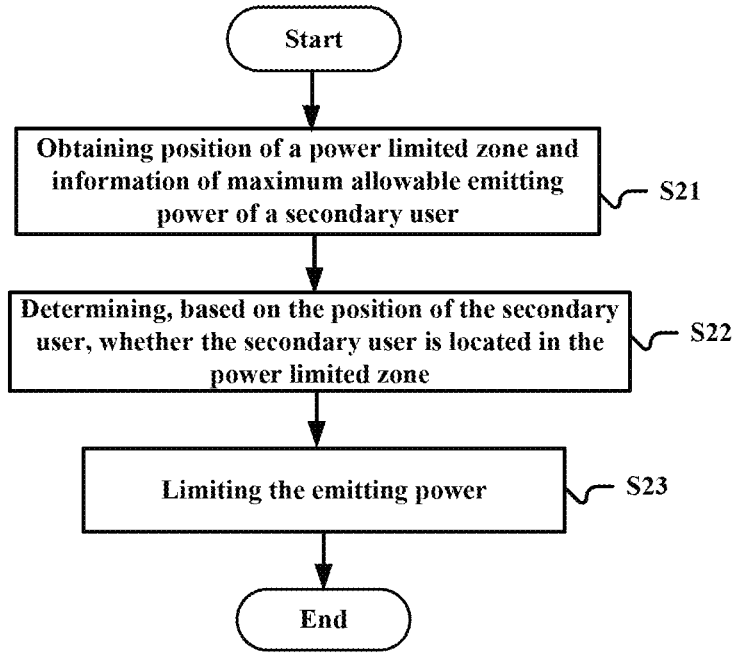
FIG. 9 is a flow chart of a method for wireless communications according to another embodiment of the present disclosure.

FIG. 9 is a flow chart of a method for wireless communications according to an embodiment of the present disclosure. The method includes: obtaining information of a power limited zone of a primary user and information of a maximum allowable emitting power of a secondary user from a spectrum management device (S21), the power limited zone of the primary user being corresponding to a three-dimensional space covered by a directional beam of the primary user; determining, based on a position of the secondary user, whether the secondary user is located in the power limited zone (S22); and limiting emitting power of the secondary user to be below the maximum allowable emitting power in a case that the secondary user is located in the power limited zone (S23). The method may be performed on a secondary user side.

In step S21, the information may be obtained through a broadcast message. The secondary user may also provide one or more of position information, antenna configuration information, moving trajectory information, and service type of the secondary user to the spectrum management device.

It should be noted that the above methods may be performed in combination or separately. Details of the above methods are described in detail in the first to second embodiments, and are not repeated herein.

For ease of understanding, a simulation example is provided below. FIG. 10 shows a top view of a simulation scenario. FIG. 11 shows an illustration of setting of parameters.

First, the influence of height difference between primary users and secondary users on the maximum emitting power of secondary users is studied based on the simulation. In the simulation scenario, it is assumed that there are 50 primary users, the heights of the primary users are randomly distributed in a range of 20 m and 100 m as shown in FIG. 11, and the heights of the secondary users are 1.5 m, 500 m, and 1000 m, respectively. The maximum emitting power of the secondary users is calculated respectively. It can be seen from the simulation result that as the height difference between a primary user and a secondary user increases, the maximum allowable emitting power of the secondary user is increased, that is, the limitation on the maximum emitting power of secondary users is reduced. If the height difference between the primary system and the secondary system reaches a threshold $\Delta h_{th}$, the interferences from the secondary user to the primary user may be ignored, that is, it is unnecessary to limit the maximum emitting power of the secondary user.

Secondly, the influence of different densities of the primary users on the maximum emitting power of the secondary user is studied based on the simulation. The number of the primary users in the simulation scenario is respectively set as 5, 50, and 500, then the density of the primary users in the simulation region is 5/km², 50/km², and 500/km² respectively. The simulation results show that in the scenarios with three different densities of the primary users, the ratio of the total area of the power limited zones to the total area of the entire simulation area is 0.2%, 7.2%, and 57.3%, respectively. It can be seen that as the density of the primary users increases, the limitation on the maximum emitting power of the secondary users increases, and the maximum allowable emitting power of the secondary users decreases.

Figure 12:
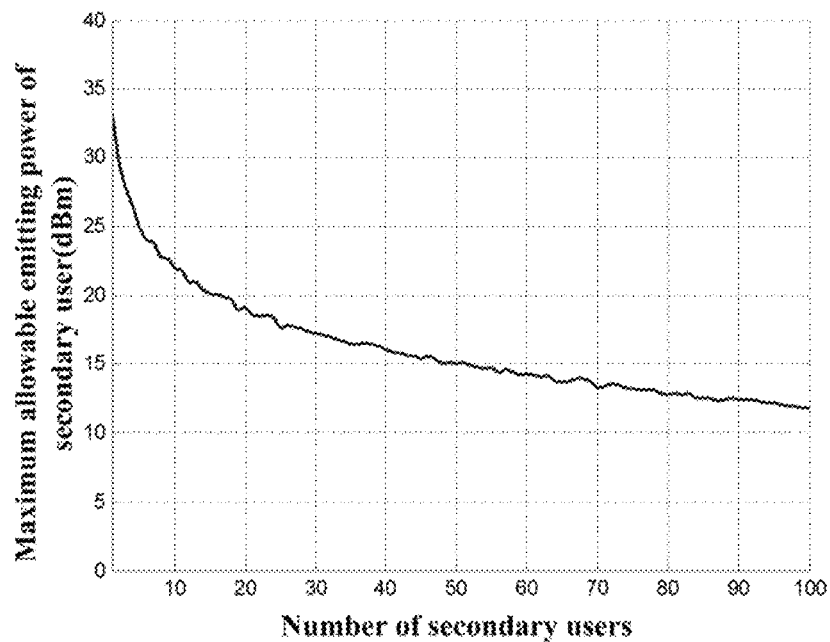
FIG. 12 shows a graph of a simulation result.

Then, the case in which multiple secondary users are located in the power limited zones is studied based on the simulation. The number of the secondary users in the power limited zones is configured to range from 1 to 100. Assuming that each of the secondary users are equally allocated with the cumulative interferences to the primary user, an average maximum allowable emitting power of the secondary user may be calculated. The simulation result is shown in FIG. 12. It can be seen that as the number of the secondary users in the power limited zones increases, the average maximum allowable emitting power of the secondary users decreases.

Figure 13:
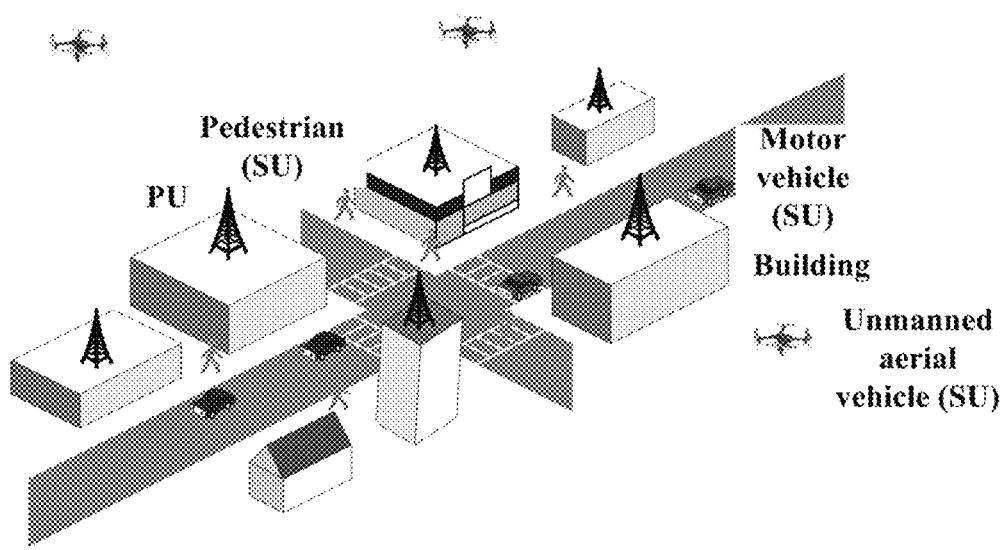
FIG. 13 shows a schematic diagram of a scenario where a millimeter wave frequency band spectrum is shared in an urban environment.

FIG. 13 shows a schematic diagram of a scenario where a millimeter wave frequency band spectrum is shared in an urban environment. In this scenario, the primary system is a backhaul network based on millimeter waves. The emitting antenna and receiving antenna of the primary system are arranged on the roofs of the buildings, and there is a certain height difference between the emitting antenna and receiving antenna of the primary user. The transmitter and receiver of the primary user respectively transmit and receive broadband data via a directional antenna. Thus, a power limited zone is formed for one primary user in each pair of primary users, and the maximum allowable emitting power of the secondary users located in the power limited zone is limited. The secondary user may be a pedestrian on the ground, a motor vehicle on the road, a user on different floors of a building, and an unmanned aerial vehicle in the sky. The significant differences between the various kinds of secondary users are as follows: 1) the heights of the different kinds of secondary users are different; 2) the power back off capabilities of the different kinds of secondary users are different. The secondary user may access in the same channel as the primary user in a case of meeting the protection requirements for the primary user.

Position information, antenna configuration information, and modulation format information of the primary users are pre-stored in the spectrum management database. The system may calculate a SINR threshold value for the primary user based on the information of the primary user, and calculate maximum cumulative interferences acceptable to each of the primary users. After entering the scenario, a secondary user first reports position information, antenna configuration information, and so on to a coexistence manager (CxM), and the CxM transmits the information to the spectrum management database. The CxM requests information of secondary users from the spectrum management database, and then calculates maximum allowable emitting power for each of the secondary users under the premise of meeting the protection requirements for the primary users. Since the types of the secondary users are different, the secondary users have different power back off capabilities. The system may intelligently allocate power back-off values for different types of secondary users. For example, in this coexistence scenario, a power back-off value of a mobile terminal of pedestrian may be lower than a power back-off value of another type of secondary user (such as a wireless access point). Finally, for each of the secondary users, it is determined whether the secondary user may access in the same channel as the primary user based on the maximum allowable emitting power of the secondary user. Specifically, if a maximum allowable emitting power of a secondary user is greater than required emitting power (minimum emitting power in the case of meeting a requirement for a minimum QoS) of the secondary user, the secondary user may access in the channel of the primary use; otherwise, the secondary user may not access in the channel of the primary use.

The technology according to the present disclosure is applicable to various products.

For example, the electronic apparatus 100 may be implemented by any types of servers, such as a tower server, a rack server and a blade server. The electronic apparatus 100 may be a control module installed in a server (such as an integrated circuit module including a single chip, and a card or blade inserted into a slot of a blade server).

For example, the electronic apparatus 200 may be implemented as various base stations. The base station may be implemented as any type of evolution Node B (eNB) or gNB (a 5G base station). The eNB includes, for example, a macro eNB and a small eNB. The small eNB may be an eNB, such as a pico eNB, a micro eNB, and a home (femto) eNB, which covers a cell smaller than a macro cell. The case for the gNB is similar to the above. Alternatively, the base station may be implemented as any other type of base station, such as a NodeB and a base transceiver station (BTS). The base station may include a body (which is also referred to as a base station device) configured to control wireless communications; and one or more remote radio heads (RRHs) arranged in a different position from the body. In addition, various types of user equipments may operate as the base station by temporarily or semi-persistently executing a base station function.

The electronic apparatus 200 may be implemented as various user equipments. The user equipment may be implemented as a mobile terminal (such as a smart phone, a tablet personal computer (PC), a notebook PC, a portable game terminal, a portable/dongle type mobile router, and a digital camera device), or an in-vehicle terminal (such as a car navigation device). The user equipment may also be implemented as a terminal (which is also referred to as a machine type communication (MTC) terminal) that performs machine-to-machine (M2M) communication. Furthermore, the user equipment may be a wireless communication module (such as an integrated circuit module including a single chip) mounted on each of the terminals.

Application Examples Regarding a Server

Figure 14:
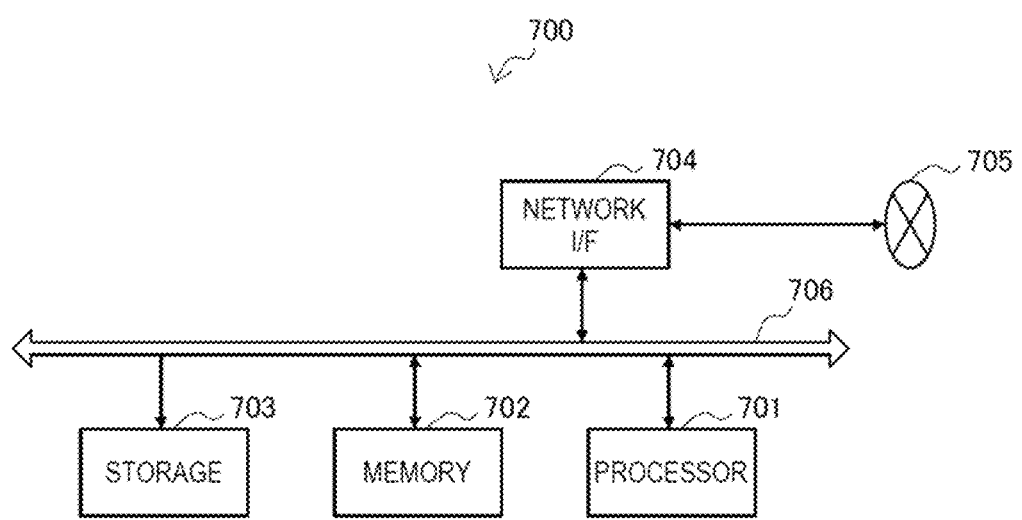
FIG. 14 is a block diagram showing an example of a schematic configuration of a server to which the technology of the present disclosure may be applied.

FIG. 14 is a block diagram showing an example of a schematic configuration of a server 700 to which the technology of the present disclosure may be applied. The server 700 includes a processor 701, a memory 702, a storage 703, a network interface (I/F) 704, and a bus 706.

The processor 701 may be, for example, a central processing unit (CPU) or a digital signal processor (DSP), and controls functions of the server 700. The memory 702 includes random access memory (RAM) and read only memory (ROM), and stores data and programs executed by the processor 701. The storage 703 may include a storage medium, such as a semiconductor memory and a hard disk.

The network interface 704 is a communication interface for connecting the server 700 to a communication network 705. The communication network 705 may be a core network such as an evolved packet core network (EPC) or a packet data network (PDN) such as the Internet.

The processor 701, the memory 702, the storage 703, and the network interface 704 are connected to each other via a bus 706. The bus 706 may include two or more buses (such as a high-speed bus and a low-speed bus) having different speeds.

In the server 700 shown in FIG. 14, the first determination unit 101 and the second determination unit 102 described with reference to FIG. 2, and the limitation unit 103 described with reference to FIG. 4 may be implemented by the processor 701. For example, the processor 701 may determine secondary users in a power limited zone by performing the functions of the first determination unit 101 and the second determination unit 102, and determine maximum allowable emitting power for each of the secondary users in the power limited zone by performing the function of the limitation unit 103.

Application Examples Regarding a Base Station

First Application Example

Figure 15:
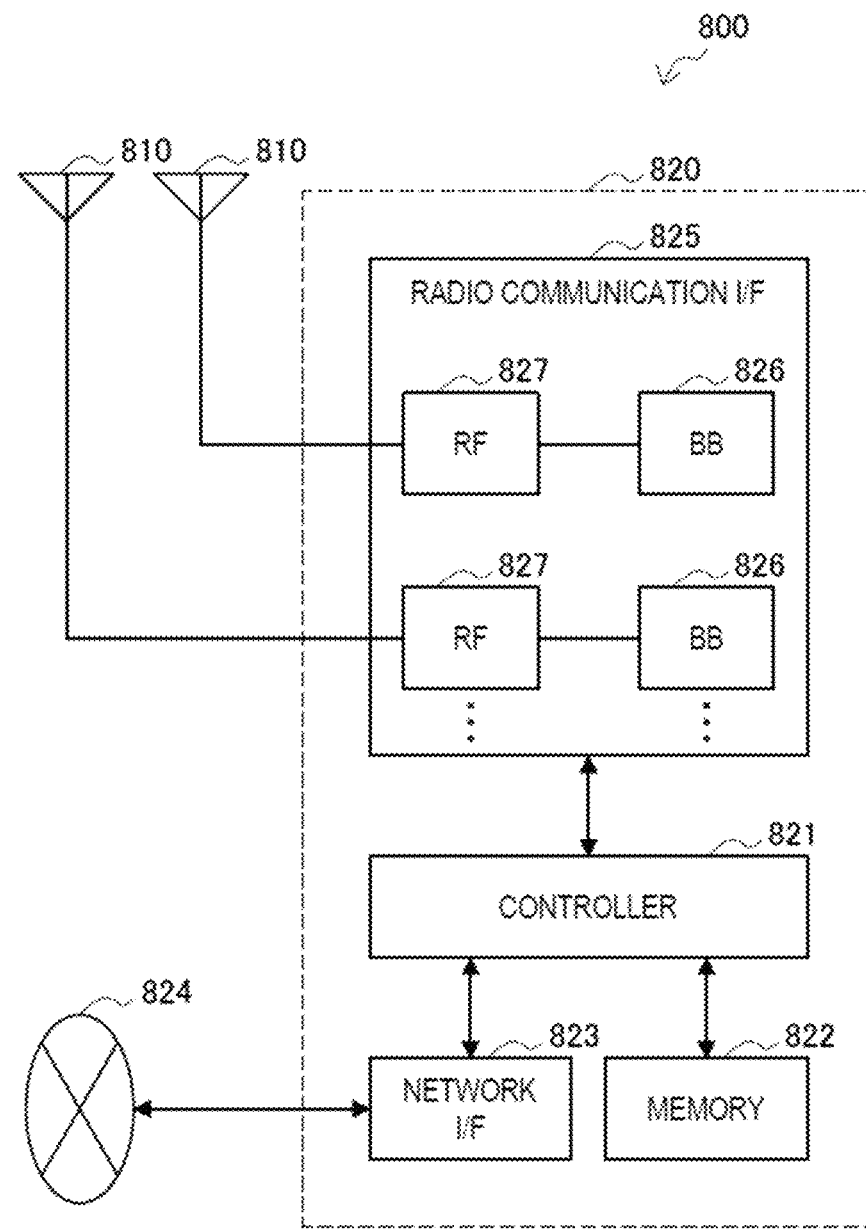
FIG. 15 is a block diagram showing a first example of an exemplary configuration of an eNB or gNB to which the technology according to the present disclosure may be applied.

FIG. 15 is a block diagram showing a first example of an exemplary configuration of an eNB or gNB to which technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 15, the eNB 800 may include the multiple antennas 810. For example, the multiple antennas 810 may be compatible with multiple frequency bands used by the eNB 800. Although FIG. 15 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 15, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 15. For example, the multiple RF circuits 827 may be compatible with multiple antenna elements. Although FIG. 15 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 15, a transceiver of the electronic apparatus 200 may be implemented by the radio communication interface 825. At least a part of the functions may also be implemented by the controller 821. For example, the controller 821 may perform the functions of the obtaining unit 201, the determination unit 202 and the limitation unit 203 to limit emission power of a secondary user.

Second Application Example

Figure 16:
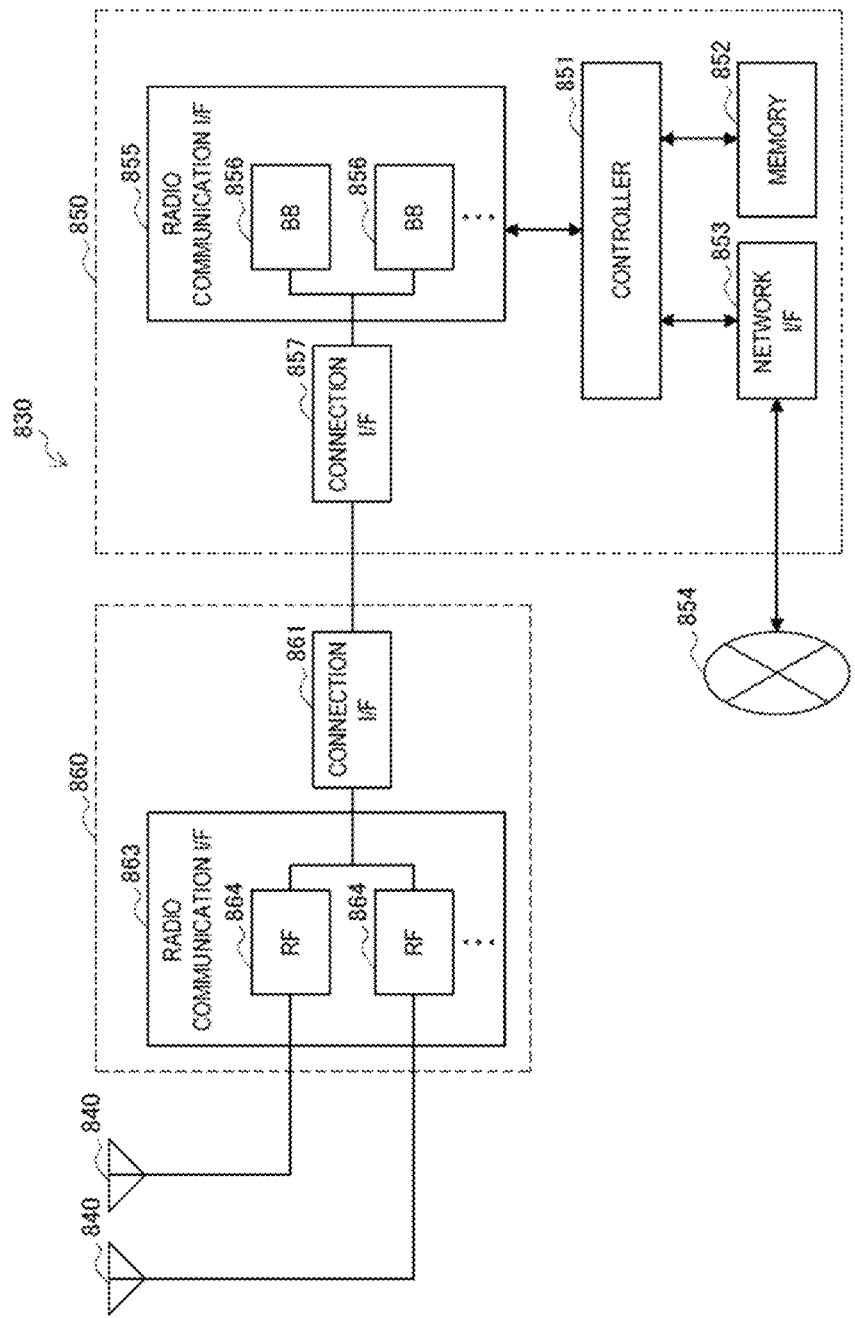
FIG. 16 is a block diagram showing a second example of an exemplary configuration of an eNB or gNB to which the technology according to the present disclosure may be applied.

FIG. 16 is a block diagram showing a second example of the exemplary configuration of an eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 16, the eNB 830 may include the multiple antennas 840. For example, the multiple antennas 840 may be compatible with multiple frequency bands used by the eNB 830. Although FIG. 16 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 15.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 15, except that the BB processor 856 is connected to an RF circuit 864 of the RRH 860 via the connection interface 857. As show in FIG. 16, the radio communication interface 855 may include the multiple BB processors 856. For example, the multiple BB processors 856 may be compatible with multiple frequency bands used by the eNB 830. Although FIG. 16 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 16. For example, the multiple RF circuits 864 may support multiple antenna elements. Although FIG. 16 shows the example in which the radio communication interface 863 includes the multiple RF circuits 864, the radio communication interface 863 may also include a single RF circuit 864.

In the eNB 800 shown in FIG. 16, a transceiver of the electronic apparatus 200 may be implemented by the radio communication interface 855 and/or the radio communication interface 863. At least a part of the functions may also be implemented by the controller 851. For example, the controller 851 may perform the functions of the obtaining unit 201, the determination unit 202 and the limitation unit 203 to limit emitting power of a secondary user.

Application Examples Regarding User Equipment

First Application Example

Figure 17:
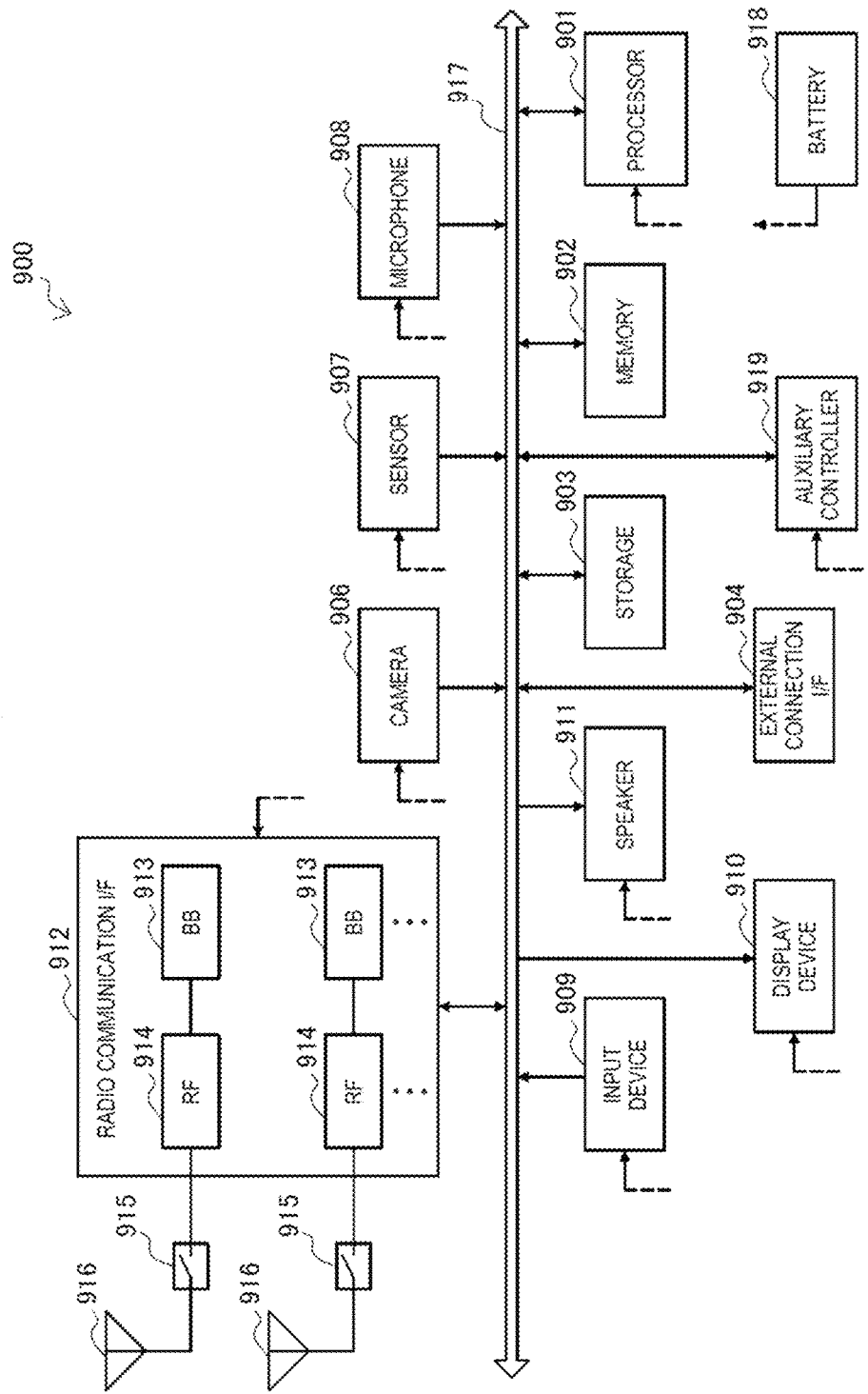
FIG. 17 is a block diagram showing an example of an exemplary configuration of a smartphone to which the technology according to the present disclosure may be applied.

FIG. 17 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals that are outputted from the smartphone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 17 shows a case that one RF link is connected to one antenna, which is only illustrative, and a case that one RF link is connected to multiple antennas through multiple phase shifters may also exist. The radio communication interface 912 may be a chip module having the BB processor 913 and the RF circuit 914 integrated thereon. The radio communication interface 912 may include multiple BB processors 913 and multiple RF circuits 914, as shown in FIG. 17. Although FIG. 17 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 17. Although FIG. 17 shows the example in which the smartphone 900 includes the multiple antennas 916, the smartphone 900 may also include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 17 via feeder lines that are partially shown as dashed lines in FIG. 32. The auxiliary controller 919, operates a minimum necessary function of the smart phone 900, for example, in a sleep mode.

In the smart phone 900 shown in FIG. 17, the transceiver of the electronic apparatus 200 may be implemented by the radio communication interface 912. At least a part of the functions may be implemented by the processor 901 or the auxiliary controller 919. For example, the processor 901 or the auxiliary controller 919 may perform the functions of the obtaining unit 201, the determination unit 202 and the limitation unit 203 to limit emitting power of a secondary user.

Second Application Example

Figure 18:
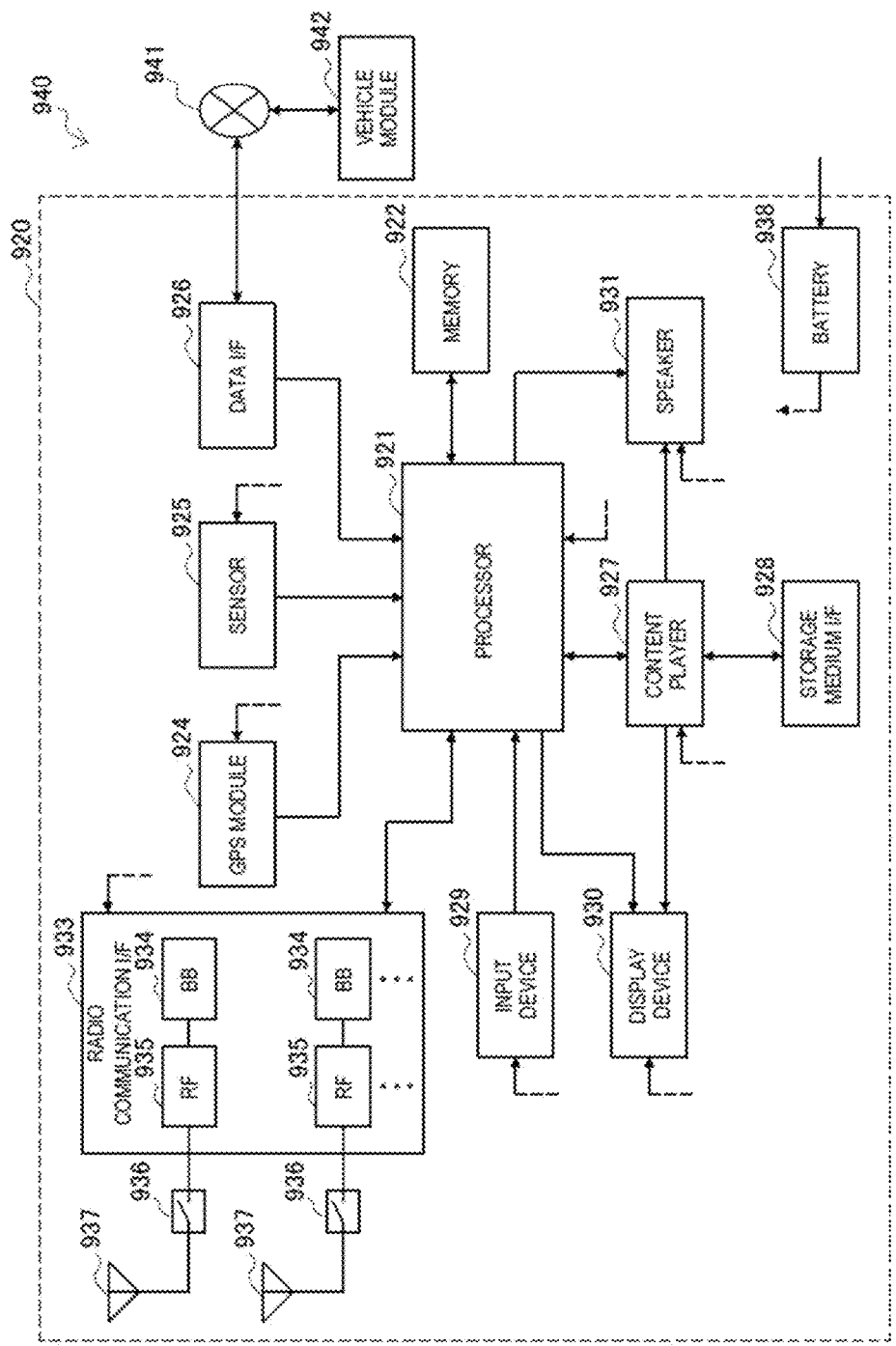
FIG. 18 is a block diagram showing an example of an exemplary configuration of a car navigation apparatus to which the technology according to the present disclosure may be applied.

FIG. 18 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sound for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 18. Although FIG. 18 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 18, the car navigation apparatus 920 may include the multiple antennas 937. Although FIG. 18 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 18 via feeder lines that are partially shown as dash lines in FIG. 18. The battery 938 accumulates power supplied from the vehicle.

In the car navigation device 920 shown in FIG. 13, the transceiver of the electronic apparatus 200 may be implemented by the radio communication interface 933. At least a part of the functions may be implemented by the processor 921. For example, the processor 921 may perform the functions of the obtaining unit 201, the determination unit 202 and the limitation unit 203 to limit emitting power of a secondary user.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1900 shown in FIG. 19) from a storage medium or network, wherein the computer is capable of implementing various functions when installed with various programs.

Figure 19:
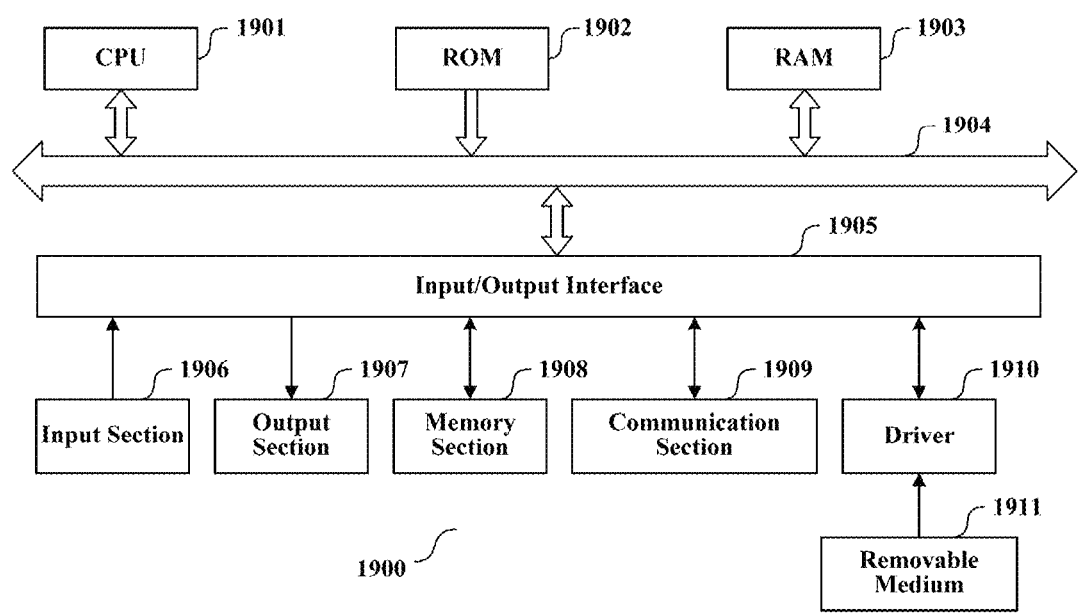
FIG. 19 is a block diagram of an exemplary block diagram illustrating the structure of a general purpose personal computer capable of realizing the method and/or device and/or system according to the embodiments of the present disclosure.

In FIG. 19, a central processing unit (CPU) 1901 executes various processing according to a program stored in a read-only memory (ROM) 1902 or a program loaded to a random access memory (RAM) 1903 from a memory section 1908. The data needed for the various processing of the CPU 1901 may be stored in the RAM 1903 as needed. The CPU 1901, the ROM 1902 and the RAM 1903 are linked with each other via a bus 1904. An input/output interface 1905 is also linked to the bus 1904.

The following components are linked to the input/output interface 1905: an input section 1906 (including keyboard, mouse and the like), an output section 1907 (including displays such as a cathode ray tube (CRT), a liquid crystal display (LCD), a loudspeaker and the like), a memory section 1908 (including hard disc and the like), and a communication section 1909 (including a network interface card such as a LAN card, modem and the like). The communication section 1909 performs communication processing via a network such as the Internet. A driver 1910 may also be linked to the input/output interface 1905, if needed. If needed, a removable medium 1911, for example, a magnetic disc, an optical disc, a magnetic optical disc, a semiconductor memory and the like, may be installed in the driver 1910, so that the computer program read therefrom is installed in the memory section 1908 as appropriate.

In the case where the foregoing series of processing is achieved through software, programs forming the software are installed from a network such as the Internet or a memory medium such as the removable medium 1911.

It should be appreciated by those skilled in the art that the memory medium is not limited to the removable medium 1911 shown in FIG. 19, which has program stored therein and is distributed separately from the apparatus so as to provide the programs to users. The removable medium 1911 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1902 and the memory section 1908 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
    processing circuitry, configured to:
    determine a first power limited zone for a first primary user of spectrum resources for the wireless communications in a primary wireless communications system, wherein the first power limited zone is a three-dimensional wireless communications space relating to a directional wireless communications beam of the first primary user of the spectrum resources for the wireless communications in the primary wireless communications system; and
    determine one or more secondary users in the first power limited zone that may share the spectrum resources for the wireless communications.

2. The electronic apparatus according to claim 1, wherein the processing circuitry is further configured to limit, based on a communication quality requirement of the primary wireless communications system, an emitting power of the one or more secondary users in the first power limited zone.

3. The electronic apparatus according to claim 2, wherein the processing circuitry is further configured to:
    calculate, based on the communication quality requirement of the primary wireless communications system, a first maximum interference power acceptable to the first primary user, and
    calculate, based on the first maximum interference power, a first maximum allowable emitting power for each of the one or more secondary users located in the first power limited zone.

4. The electronic apparatus according to claim 3, wherein the processing circuitry is configured to:
    allocate, in a case of ensuring that maximum cumulative interferences caused by the one or more secondary users to the first primary user do not exceed the first maximum interference power, a maximum interference power that each of the one or more secondary users is respectively capable of producing to the first primary user, and
    calculate, based on the allocated maximum interference power, the first maximum allowable emitting power for each of the one or more secondary users.

5. The electronic apparatus according to claim 4,
wherein the processing circuitry is configured to allocate the first maximum interference power equally among the one or more secondary users, or
wherein the processing circuitry is configured to allocate the first maximum interference power based on types or power adjustment capabilities of each of the one or more secondary users.

6. The electronic apparatus according to claim 3, wherein the processing circuitry is further configured to:
determine a second power limited zone for a second primary user of the spectrum resources for wireless communications in the primary wireless communications system,
wherein the second power limited zone is a second three-dimensional wireless communications space defined by a second directional wireless communications beam from the second primary user to a fourth primary user of the spectrum resources for wireless communications in the primary wireless communications system;
determine one or more additional secondary users of the spectrum resources for wireless communications in the second power limited zone; and
calculate, based on the communication quality requirement of the primary wireless communications system, a second maximum interference power acceptable to the second primary user, and calculate, based on the second maximum interference power, a second maximum allowable emitting power for each of the one or more additional secondary users in the second power limited zone,
wherein, the processing circuitry is configured to, in a case that a particular secondary user of the one or more additional secondary users is located in an overlapping region of the first power limited zone and the second power limited zone, determine a smaller one of the first maximum allowable emitting power and the second maximum allowable emitting power as an assigned maximum allowable emitting power of the particular secondary user.

7. The electronic apparatus according to claim 3, wherein the processing circuitry is further configured to, for each of the one or more secondary users:
allocate specific spectrum resources for the wireless communications, and
configure an emitting power, based on the first maximum allowable emitting power.

8. The electronic apparatus according to claim 7, wherein, for each of the one or more secondary users, the processing circuitry is further configured to dynamically adjust the allocated specific spectrum and the configured emitting power, in a case that a corresponding secondary user state changes by a predetermined degree.

9. The electronic apparatus according to claim 8,
wherein, for each of the one or more secondary users, the processing circuitry is further configured to:
set a hysteresis parameter threshold, and
dynamically adjust the allocated spectrum allocation and the configured emitting power, in a case that a time period during which the corresponding secondary user state changes by the predetermined degree exceeds the hysteresis parameter threshold, or
wherein the processing circuitry is configured to preferentially adjust a corresponding spectrum allocation and a corresponding emitting power of a secondary user of the one or more secondary users with low mobility.

10. The electronic apparatus according to claim 7,
wherein the processing circuitry is further configured to determine a maximum number of the one or more secondary users allowed in the first power limited zone, based on a minimum emitting power of each of the one or more secondary users in the first power limited zone while ensuring a requirement for quality of service of the corresponding secondary user, and
wherein the processing circuitry is configured to preferentially allocate spectrum resources to a secondary user of the one or more secondary users causing less interference to the first primary user, in a case that an actual number of the one or more secondary users in the first power limited zone exceeds the maximum number.

11. The electronic apparatus according to claim 3, wherein the processing circuitry is configured to add a predetermined margin to the communication quality requirement in calculating the first maximum interference power acceptable to the first primary user.

12. The electronic apparatus according to claim 2, wherein, for each of the one or more secondary users, the processing circuitry is configured to:
pre-calculate a first maximum allowable emitting power a corresponding secondary user position in the first power limited zone, based on at least a density of the primary users in the primary wireless communications system, a density of the one or more secondary users in the first power limited zone, or the communication quality requirement of the primary wireless communications system, and
broadcast information of a range of the first power limited zone and information of the first maximum allowable emitting power to the one or more secondary users so that each of the one or more secondary user sets the emitting power according to its own position.

13. The electronic apparatus according to claim 1, wherein the processing circuitry is configured to determine the first power limited zone based on position information and antenna configuration information of the first primary user.

14. The electronic apparatus according to claim 1, wherein the processing circuitry is configured to determine, at least based on position information of a secondary user of the one or more secondary users, whether the secondary user is located in the first power limited zone.

15. The electronic apparatus according to claim 1, wherein the processing circuitry is configured to obtain one or more of the following from a spectrum management database:
position information of primary users, including the primary user,
antenna configuration information of the primary users,
position information of the one or more secondary users,
antenna configuration information of the one or more secondary users,
moving trajectory information of the one or more secondary users, or
service types of the one or more secondary users.

16. A method for wireless communications, comprising:
determining a first power limited zone for a first primary user of spectrum resources for the wireless communications in a primary wireless communications system,
wherein the first power limited zone is a three-dimensional space relating to a directional wireless communications beam of the first primary user of the spectrum resources for the wireless communications in the primary wireless communications system; and determining one or more secondary users in the first power limited zone that may share the spectrum resources for the wireless communications.

* * * * *